Figure 1:
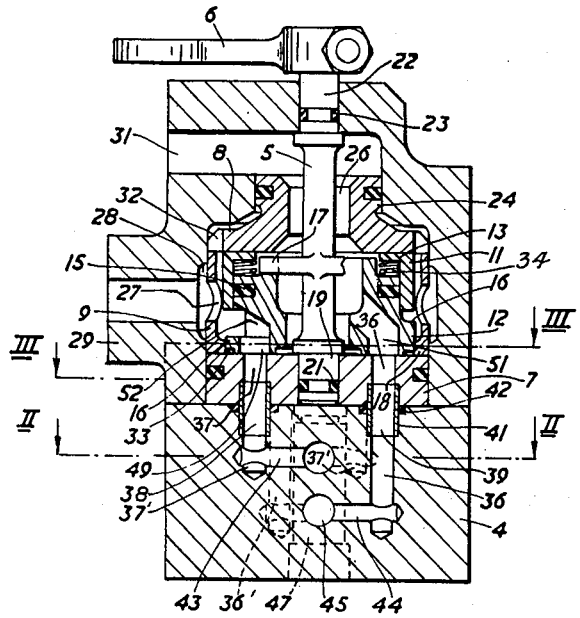

Oct. 22, 1957　　G. SELWOOD ET AL　　2,810,399
FLUID CONTROL VALVES
Filed Jan. 23, 1956

INVENTORS
GEORGE SELWOOD
FREDERICK J. FUELL
EDWARD T. RUTLEDGE

BY Watson, Cole, Grindle and
Watson ATTORNEYS

United States Patent Office 2,810,399
Patented Oct. 22, 1957

2,810,399

FLUID CONTROL VALVES

George Selwood, Frederick James Fuell, and Edward Tom Rutledge, Hayes, England, assignors to The Fairey Aviation Company Limited, Hayes, England, a British company Application January 23, 1956, Serial No. 560,828

Claims priority, application Great Britain January 24, 1955

6 Claims. (Cl. 137—620)

This invention relates to fluid control valves and one application for which the invention is particularly though not exclusively suitable is to a hydraulic changeover valve for use in a hydraulic servo system employing a high pressure for example of the order of 4,000 lbs. per square inch.

In such applications various forms of slide valve have previously been proposed, in some of which the moving member in constructed and arranged so that the fluid pressure acting on it has a resultant tending to force the ported surfaces together. Preferably this resultant corresponds to the fluid pressure on only a small fraction of the total area of the slide. One difficulty with such a construction, when employing very high pressures, is that in one position of the valve the high pressure can be applied to one working port or a portion of it and the low pressure to another working port or portion of it, whilst in another position of the valve the reverse condition will occur. The pressures on these surfaces are liable to produce a tilting effect which increases the frictional resistance to movement of the valve. In a servo system where the valve should respond to a minimum force this is clearly undesirable and in extreme cases jamming of the valve may even tend to occur.

An object of the invention is to provide an improved construction which avoids these disadvantages.

According to one aspect of the present invention, a fluid control valve includes a movable member mounted to rotate about an axis relatively to a platen member, the movable member and the platen affording co-operating end surfaces having in them ports, high pressure and low pressure ports in one member and inlet and outlet ports in the other, in which there are more than one high pressure port interconnected so that the fluid pressures in them are the same and positioned and dimensioned so that the resultant force between the members does not tend to tilt the movable member. For example there may be a pair of high pressure ports centred on a straight line through the axis and on opposite sides of it.

According to another aspect of the present invention, a fluid control valve includes a movable member mounted to rotate about an axis relatively to a platen member, the movable member and the platen affording co-operating end surfaces having in them co-operating ports in pairs, whereof each pair comprises two ports in one of the members centred on a straight line through the axis and on opposite sides of it, the two ports of each pair being interconnected so that the fluid pressures in the two ports of any one pair are the same. Conveniently the co-operating surfaces of the movable member and the platen are flat, thereby facilitating accurate grinding. The product of the area and the distance of centre of area of the axis for one port in any one pair may be equal to the same product for the other port of the same pair to achieve the desired balancing effect of the fluid pressures.

One member may include a pair of high pressure and a pair of low pressure ports, while the other includes a pair of inlet and a pair of outlet ports arranged so that in a central position of the movable member no port in any one member communicates with a port in the other and the ports are arranged around the axis in the order, high pressure port, inlet port, low pressure port, outlet port, and so on. In considering the order of the ports arranged about the axis, two adjacent interconnected ports count as one port. Preferably movement of the movable member from the central position puts the high pressure ports into communication with the inlet or outlet ports as the case may be, before the low pressure ports come into communication with the outlet or the inlet ports.

Preferably the moving member is constructed and arranged so that the fluid pressure acting on it has a resultant tending to force the ported surfaces together. For example, the ported movable member may be one of a pair of telescopically connected sleeves both arranged to turn together about the axis of rotation and interposed between the ported platen and an opposed surface of a second platen, the arrangement being such that the fluid pressure acting on them has a resultant tending to force them apart, thereby forcing the ported surface of one sleeve against the ported platen and forcing the opposite surface of the other sleeve against the second platen. Preferably the resultant force corresponds to the fluid pressure on only a small fraction of the total overlapping area between the sleeves.

In one form of the invention the two platens are mounted in an outer body and are held spaced apart by a spacer engaging their opposed surfaces so as to hold them accurately parallel, one or each platen being free to shift slightly so as to enable both platens to engage the spacer. The spacer may for example be a sleeve surrounding both the moving members. Conveniently the second platen is constructed and arranged so that the fluid pressure acting on it has a resultant tending to force it towards the ported platen so as to maintain both platens firmly in engagement with the spacer.

Figure 2:
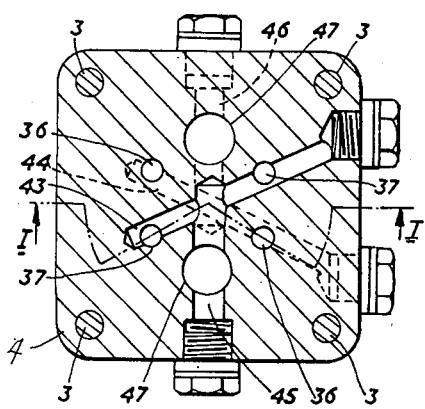
Figure 3:
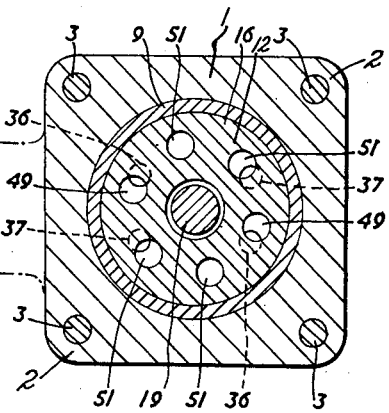

The invention may be carried into practice in various ways, but one specific embodiment will be described by way of example as applied to a hydraulic change-over valve for a high-pressure servo system employing a pressure of some 4,000 lbs. per square inch, with reference to the accompanying drawings of which Figure 1 is a sectional elevation of the valve on the line I—I in Figure 2, Figure 2 is a section on the line II—II in Figure 1 and Figure 3 is a section on the line III—III in Figure 1.

The valve is mounted in a housing 1 formed by a generally tubular valve body having lugs 2 projecting at the corners of a square to receive bolts 3 by which it is bolted to a base block 4. Projecting through a hole in the closed end of the body remote from the base block 4, which will be referred to as the top end, is a spindle 5 for operating the valve, having, outside the housing, an operating arm 6 for connection to the controlling mechanism (not shown). Resting on the base block 4 in the lower part of the tubular bore in the body 1 is a ported platen 7 in the form of a thick disc having in it a number of ports referred to below. A second or upper platen 8 is also contained within the bore of the valve body and is spaced from the ported platen 7 by means of a spacing sleeve 9 engaging the peripheral portions of the two platens 7 and 8 and fitting fairly closely in the bore of the body 1. The ends of the spacing sleeve 9 are accurately ground so as to maintain the opposed faces of the two platens 7 and 8 accurately parallel.

In the chamber formed between the opposed faces of the two platens and their spacing sleeve is mounted the moving member of the valve, which comprises a pair of sleeves 11 and 12 telescopically arranged one within the other. The upper, outer sleeve 11 has an inwardly-directed flange 13 at its upper edge and its upper surface engages the upper platen 8. The lower, inner sleeve 12 has a spigot portion fitting into the outer sleeve 11 and formed with a circumferential groove containing a sealing ring 15, whilst at its lower end it has a slight outwardly-projecting flange 16. Its lower surface has in its ports, described below, and engages the ported surface of the lower platen 7.

The spindle 5 is formed with dogs 17 to engage recesses formed in the bore of the inner valve sleeve 12 so as to transmit a rotary movement from the spindle 5 to the sleeve 12 whilst permitting slight relative movement in other directions. The spacing sleeve 9 has near its lower end an internal circumferential rib 18 accurately ground to centre the inner valve sleeve 12. The lower end 19 of the spindle 5 is carried in a bearing in the lower platen 7 and has a circumferential groove receiving a sealing ring 21, whilst the upper end 22 of the spindle 5 is carried in a bearing in the upper end of the valve body and also has in it a circumferential groove to receive a sealing ring 23.

The upper end of the bore in the valve body 1 is of reduced diameter as compared with the lower part, and the upper platen has a spigot portion 24 extending as a piston into this reduced portion of the bore and provided with a sealing ring 25 in a circumferential groove. A bore extends through this upper platen 8 to allow the passage of the spindle 5 and also to provide an annular clearance passage 26 around the spindle.

The spacing sleeve 9 between the platens 7 and 8 has in its wall a number of openings 27 and its central portion is surrounded by an annular recess 28 formed in the wall of the bore of the valve body 1, which communicates through a suitable coupling 29 with the high pressure side of a liquid supply. The upper reduced portion of the bore in the valve body has a similar coupling 31 communicating with the low pressure return pipe of the liquid supply. Accordingly the space surrounding the valve sleeves 11 and 12 is in communication with the high pressure side of the supply, and in addition the peripheral edge of the upper platen 8 is formed with a number of notches 32 so as to admit this pressure to the upper surface of the enlarged part of the upper platen. The low pressure of the return line is communicated to the interior of the valve sleeves 11 and 12 through the opening in the upper platen and is also applied to the upper end of the spigot portion 24 of the upper platen.

Accordingly the high pressure acts on the lower end face of the outer valve sleeve 11 whilst the upper face is sealed against the platen 8 and accordingly a resultant upward force is exerted on the outer valve sleeve. Similarly the high pressure acts on the upper surface of the external flange 16 at the bottom of the inner valve sleeve 12, whilst its under surface is sealed against the lower 7 platen so that a resultant downward force is exerted on the inner valve sleeve. Although these areas are not large the force may nonetheless be excessive and in this event the extreme outer portions of the surfaces of the valve sleeves engaging the platens may be relieved as at 33 so as to admit the high pressure to them and thereby reduce the resultant force urging them apart. A circular leaf or other form of spring 34 may be interposed between the upper end of the inner sleeve 12 and the flange 13 of the outer sleeve 11 to keep the sleeves apart when the pressure is cut off.

Similarly the high pressure is admitted to the upper surface of the lower part of the upper platen 8 through the notches 32 referred to above, whilst the lower surface is sealed against the upper surface of the outer valve sleeve 11. Accordingly there will be a resultant force urging the upper platen 8 downwards against the spacing sleeve 9 and also urging the spacing sleeve downwards onto the lower platen 7 so as to retain the two platens with their opposed faces held accurately parallel by the spacing sleeve.

The lower platen 7 has formed in it two pairs of working ports 36 and 37. Each pair comprises two equal ports at equal distances from the axis of the spindle 5 at diametrically opposite positions. Each pair of ports communicates with longitudinal passages 38, 39 in the base block 4, to which they may be connected by liners 41 and sealing rings 42, and the two ports of each pair are interconnected by a diametrical connecting passage 43 or 44 formed in the base block. The two diametrical connecting passages are formed at different levels so as to cross one another without meeting. Each diametrical connecting passage is also connected by a radial passage 45 or 46 with a longitudinal inlet or outlet pipe connection 47 or 47', the outer ends of the radial and diametrical passages being plugged. The longitudinal inlet and outlet pipe connections 47, 47' may conveniently serve to accommodate screws (not shown) for bolting the lower platen 7 to the base block 4.

The inner valve sleeve 12 also has in it a pair of high pressure ports 49 and two pairs of low pressure ports 51. The high pressure ports are identical with one another and are situated at diametrically opposite points. Each high pressure port 49 opens into a recess 52 in the outer wall of the inner valve sleeve 12 and hence communicates with the high pressure side of the supply. In the central position of the valve each high pressure port 49 is situated between two of the working ports 36 and 37 of the lower platen 7, one working port of each pair, but slight movement of the valve in one direction or the other about its axis will bring the high pressure ports 49 partially into register with the two working ports of one pair 36, or the two working ports of the other pair 37, according to the direction of rotation.

Thus each high pressure port may be said to lie normally between two working ports. Correspondingly situated outside the working ports are the two pairs of low pressure ports 51. The two ports of each such pair are again identical and diametrically placed with respect to the axis. All these four ports 51 open into the interior of the inner valve sleeve 12 and thereby communicate with the low pressure side of the system.

From what has been said it will be appreciated that in the central position of the valve the low pressure ports 51 are just clear of the working ports 36 and 37 but slight turning of the valve in one direction will bring one pair of low pressure ports into communication with one pair of working ports whilst slight movement in the other direction will bring the other pair of low pressure ports into partial register with the other pair of working ports. In Figure 3 the valve is shown with the high pressure ports 49 just overlapping the working ports 36.

The valve laps are preferably arranged so that the high pressure ports 49 communicate with the working ports 36 or 37 slightly before the low pressure ports 51 do so. Accordingly the high pressure will first be communicated to the jack or ram of the servo system, but no movement can occur until the low pressure ports communicate with the companion working ports. In this way a positive movement is obtained.

It will be appreciated that the construction provides an arrangement in which the pressures on the various ports are always symmetrical about the axis so that there is no possibility of their producing a tendency to tilting of the moving parts under any conditions. In addition to this the layout is compact and a relatively small size of valve can be employed for a given flow.

What we claim as our invention and desire to secure by Letters Patent is:

1. A fluid control valve including a movable member mounted to rotate about an axis relatively to a platen member, the movable member and the platen affording cooperating end surfaces having in them co-operating ports in pairs, wherein each pair comprises two ports in one of the members centered on a straight line through the axis and on opposite sides of it, the two ports of each pair being interconnected so that the fluid pressures in the two ports of any one pair are the same, in which the movable member comprises a pair of telescoping sleeves arranged to turn together about the axis and interposed between the ported platen and a second platen spaced from it, while the two platens are mounted in an outer body and are held apart by a spacer engaging their opposed surfaces so as to hold them accurately parallel.

2. A fluid control valve as claimed in claim 1 in which the spacer comprises a sleeve surrounding the movable member.

3. A fluid control valve as claimed in claim 2 in which the fluid pressure has a resultant tending to force the two platens together.

4. A fluid control valve including a movable member mounted to rotate about an axis relatively to a platen member, the movable member and the platen affording co-operating end surfaces having in them co-operating ports in pairs, wherein each pair comprises two ports in one of the members centred on a straight line through the axis and on opposite sides of it, the two ports of each pair being interconnected so that the fluid pressures in the two ports of any one pair are the same, in which the movable member comprises a pair of telescoping sleeves arranged to turn together about the axis and interposed between the ported platen and a second platen spaced from it, while the two platens are mounted in an outer body and are held apart by a spacer engaging their opposed surfaces so as to hold them accurately parallel and in which the fluid pressure has a resultant tending to force the movable member and the ported platen together.

5. A fluid control valve as claimed in claim 4 in which the spacer comprises a sleeve surrounding the movable member.

6. A fluid control valve as claimed in claim 5 in which the fluid pressure has a resultant tending to force the two platens together.

References Cited in the file of this patent

UNITED STATES PATENTS 916,262    Brocke _____ Mar. 23, 1909